United States Patent [19]

Rafeld

[11] 4,145,150
[45] Mar. 20, 1979

[54] ANGULAR CORNER CONNECTING PIECE FOR PROFILED FRAME MEMBERS OF MULTI-SHEET INSULATING GLASS

[76] Inventor: Karl Rafeld, Kirnachstrasse 15-18, Altdorf-Ebenhofen, Fed. Rep. of Germany

[21] Appl. No.: 859,048

[22] Filed: Dec. 9, 1977

[51] Int. Cl.² .............................................. E04C 2/54
[52] U.S. Cl. .................................. 403/295; 403/402; 52/656
[58] Field of Search ............... 403/401, 402, 295, 205; 52/656, 616

[56] References Cited
U.S. PATENT DOCUMENTS 3,866,380  2/1975  Benson ............................. 403/401 X

FOREIGN PATENT DOCUMENTS 2416615 10/1975 Fed. Rep. of Germany .......... 403/401
1378300 12/1974 United Kingdom ..................... 403/295

Primary Examiner—Andrew V. Kundrat
Attorney, Agent, or Firm—Andrus, Sceales, Starke & Sawall

[57] ABSTRACT

An angular corner connecting piece for profiled frame members of multi-sheet insulating glass has angularly disposed legs adapted to be inserted into cornerwise adjacent profiled frame members of the multi-sheet glass. The legs include a base plate having a plurality of projecting ribs. The legs are connected by a rigidifying head having walls. At least one spring is connected between each pair of ribs and between one of the ribs and the walls of the rigidifying member and are resiliently deformable upon insertion of the legs into the profiled frame members. The rigidifying head has transverse sealing grooves and pairs of guide ribs.

3 Claims, 2 Drawing Figures

U.S. Patent  Mar. 20, 1979  4,145,150
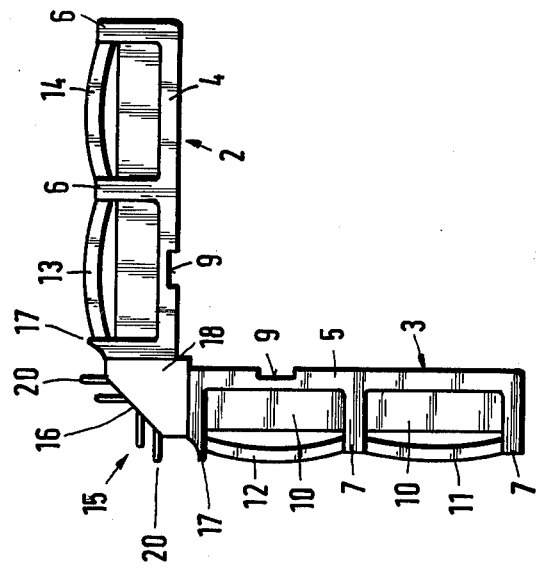
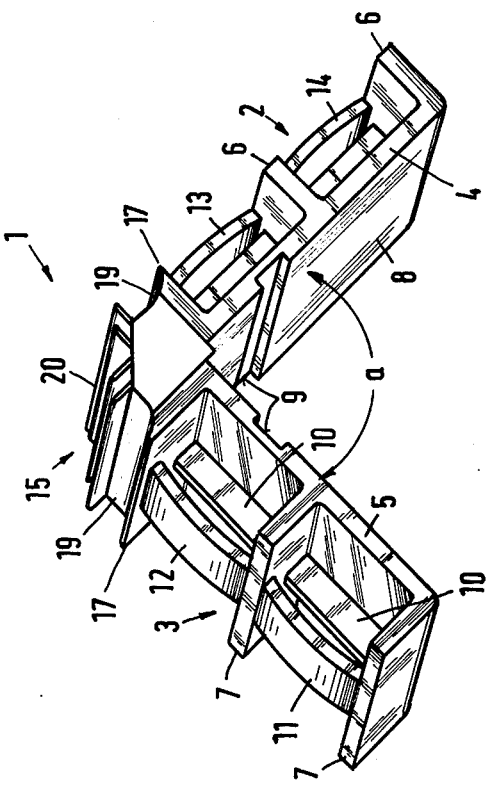

ANGULAR CORNER CONNECTING PIECE FOR PROFILED FRAME MEMBERS OF MULTI-SHEET INSULATING GLASS

BACKGROUND OF THE INVENTION

The invention relates to an angular corner connecting piece for profiled frame members of multi-sheet insulating glass, the two legs of which that are connected across a corner are adapted to be inserted into cornerwise adjacent profiled frame members of the multi-sheet insulating glass and include a base plate, out of which a plurality of ribs project, which are adapted to the cross-section of the profiled frame member and extend in transverse leg direction, the legs being connected in the region of the angle which they enclose by a rigidifying head forming with them an integral unit which angle approximately corresponds to the angle enclosed by the adjacent profiled frame members that are to be connected to one another. Across these ribs at least one top spring extends which is, upon insertion of the leg into the respective profiled frame member, resiliently deformable and is connected with the ribs. The external surface of the rigidifying head facing away from the angle enclosed by the legs is provided on its lateral edges adjacent to the top springs with a sealing groove extending transversely to the longitudinal leg direction, said groove being defined by a sealing lip.

Known angular connecting pieces of this type are provided with a sealing agent in the region of the rigidifying head after their legs have been slid into the front end openings of the profiled frame members abutting at an angle; the sealing agent serves to seal the front end cavity openings of the profiled member and forms a diffusion barrier which prevents water vapour from penetrating from outside into the profiled member cavities, in which there is provided a hygroscopic medium to absorb the air moisture present between the adjacent insulating glass sheets. The rigidifying heads used so far on such angular corner connecting pieces in the region in which the two legs are abutting are provided on their external surface with sealing grooves receiving adhesive, with the sealing grooves being intended to make sure that the sealing mass remains adherent on the angular corner connecting piece in the region of the rigidifying head and penetrates far enough into the openings of the profiled member so as to completely prevent water vapour diffusion.

Now it has turned out that in many cases the smooth outer surface of the rigidifying head that is laterally defined by the sealing grooves does not retain the sealing mass to the desired extent.

DESCRIPTION OF THE INVENTION

It is therefore an object underlying the invention to provide mechanical means for retaining the sealing mass on the surfaces of the rigidifying head, in addition to the adhesion forces existing between the sealing mass and the surface. According to the invention the outer surface of the rigidifying head is inclined by 45° relative to the longitudinal direction of the two legs enclosing an angle of 90° and to provide it with ribs extending parallel to the sealing lips, the ribs enclosing angles of about 45° or, respectively, 135° with the surface of the rigidifying head.

The sealing means then enters into the interstices of the ribs and is retained by the ribs, which in this case have the effect of barb-like elements and, hence, prevent release of the sealing mass or composition from the surface of the rigidifying head.

According to an advantageous further development of the invention the upper ends of the ribs extend in a common plane parallel to the surface of the rigidifying head.

In a particularly advantageous arrangement of the ribs the group of ribs that is adjacent to the one leg of the angular corner connecting piece may rise from the surface in longitudinal axial direction of the one leg, while another group of ribs rises from the surface in longitudinal axial direction of the other leg of the angle piece.

Two adjacent groups of ribs are formed in this manner which enclose an angle of 90° relative to one another.

In the drawings

FIG. 1 is an isometrical view of an angular corner connecting piece, and

FIG. 2 is a lateral view of the angular corner connecting piece of FIG. 1.

The angular corner connecting piece 1 shown in FIG. 1 is a plastic injection molded article, for example consisting of a wear-resistant polyamide, in particular ultramide. It includes two legs 2,3 which are connected to one another at an angle of about 90° by a rigidifying head 15 with which they form an integral unit. Each of these two legs 2,3 consists of a base plate 4,5 on which guide ribs 6,7 stand approximately perpendicularly and extend over the width of the base plate, i.e. transversely to the longitudinal direction of the legs, and are connected with one another at their upper edge by means of a resiliently deformable top spring 11,12,13,14, as shown in FIGS. 1 and 2.

A further connection between the guide ribs 6,7 is provided by a central cross piece 10 positioned on the base plate and having an additional rigidifying effect. There is at least one groove 9 each disposed transversely to the longitudinal leg direction on the lower side 8 of the base plates 4,5 to interrupt the chip when the angular corner connecting piece is assembled into the profiled member.

The rigidifying head 15 with its lateral surfaces 18 is positioned in the range of abutment of the two legs 2,3 and has an outer surface 16 facing away from the angle $a = 90°$ enclosed by the legs 2,3. Two sealing grooves 19 each extend over the width of the rigidifying head 15 on its lateral edges adjacent to the top springs 12,13. Each groove is defined by a sealing lip 17 which in the state of assembly of the angular corner connecting piece 1 is disposed within the profiled member and engages sealingly the inner wall thereof.

The sealing grooves 19 serve to receive a sealing material which is pressed onto the rigidifying head after the angular corner connecting piece and the profiled members have been assembled. In this assembly the profiled members of a multi-sheet insulating glass frame are in abutment to one another at a right angle and are securely connected to one another by the legs 2,3 of the angular corner connecting piece through the rigidifying head 15. The sealing material pressed onto the surface 16 of the rigidifying head fills the sealing grooves 19 and enters into the front end openings of the profiled members so that it partly fills the cavity of the profiled member in this region and forms a barrier to vapour diffusion there. In that respect, the sealing lip 17 defining the sealing groove prevents further penetration into the cavity of the profiled member, which cavity is filled with a hygroscopic agent, for example a powder or a gas, in order to absorb the air moisture present between the sheets of insulating glass.

As may be recognized from FIG. 1, the sealing grooves 19 may extend over the entire width of the rigidifying head 15, thus further improving the retention for the sealing material which is not shown in the drawing. The outer surface 16 of the head that is located between the two sealing grooves 19 of the rigidifying head is flat and extends at an angle of about 45° to the longitudinal axis of the legs 2,3.

In order to still further improve adhesion of the sealing mass or composition to the surface 16 of the rigidifying head 15, ribs 20 are provided on the surface which extend parallel to the sealing lips and enclose angles of about 45° or, respectively, 135° with the surface of the rigidifying head. These ribs the upper end of which lie in a common plane parallel to the surface 16 of the rigidifying head 15 retain the adhesive material pressed onto the head because said material penetrates between the ribs and is anchored by the ribs on the head.

As may be seen from FIG. 2 the ribs 20 adjacent to the one leg 2 of the angular corner connecting piece project in the same direction from surface 16 as the sealing lip 17 associated with said leg 2, whereas the ribs 20 adjacent to the other leg 3 likewise extend in the same direction away from the surface 16 as it does the sealing lip 17 associated with this leg 3. This means that the ribs may be divided up into two groups positioned approximately perpendicularly on one another. One group encloses an angle of 45° with the surface 16 while the other group defines an angle of 135° with this surface.

Furthermore, the upper ends of the ribs are arranged in a common plane parallel to the surface 16 of the rigidifying head. In this manner, the ribs exert a barb-like function relative to the sealing material adhering to the rigidifying head which prevents loosening of the sealing material from the surface of the head.

It is, of course, to be understood that the present invention is, by no means, limited to the particular examples, but also comprises any modifications within the scope of the appended claims.

What is claimed is:

1. An angular corner connecting piece suitable for use with profiled frame members of multi-sheet insulating glass comprising:
    a pair of longitudinally extending legs angularly disposed with respect to each other by an angle of 90° and insertable into the hollow crosswise adjacent profiled frame members of the multi-sheet insulating glass, each of said leg members including a base plate having at least a pair of spaced projecting ribs adapted to the cross-section of the profiled frame member and lying transverse to the direction of extension of said legs; and
    a rigidifying head connecting said legs into an intergral unit, said head having walls lying parallel to said spaced ribs of said legs, springs extending between said ribs and walls and resiliently deformable upon insertion of the legs into the respective profiled frame member, said walls of said rigidifying head forming sealing grooves in said head defined by sealing lips on said walls, said grooves extending transversely to the direction of extension of said legs, said rigidifying head having an outer surface normal to said walls with an exposed edge inclined by 45° relative to the longitudinal extension of said legs, said head having pairs of guide ribs extending parallel to said sealing lips and enclosing angles of about 45°, respectively, 135° with the edge of said rigidifying head outer surface.

2. An angular corner connecting piece as claimed in claim 1 wherein the upper ends of said guide ribs of said rigidifying head are located in a common plane parallel to said exposed edge of the rigidifying head outer surface.

3. An angular corner connecting piece as claimed in claim 1 wherein said guide ribs lie parallel to the adjacent wall of said rigidifying head.

* * * * *